(12) United States Patent
Piquer Pérez et al.

(10) Patent No.: US 11,027,936 B2
(45) Date of Patent: Jun. 8, 2021

(54) CONVEYING DEVICE FOR CONVEYING GOODS

(71) Applicant: FAGOR ARRASATE, S. COOP., Arrasate (ES)

(72) Inventors: Jose Manuel Piquer Pérez, Irun (ES); Adolfo Lopez Sanchez, Errenteria (ES)

(73) Assignee: FAGOR ARRASATE, S. COOP., Arrasate (ES)

( * ) Notice: Subject to any disclaimer, the term of this patent is extended or adjusted under 35 U.S.C. 154(b) by 218 days.

(21) Appl. No.: 16/411,505

(22) Filed: May 14, 2019

(65) Prior Publication Data
US 2019/0352105 A1 Nov. 21, 2019

(30) Foreign Application Priority Data
May 17, 2018 (EP) .................................... 18382338

(51) Int. Cl.
*B65H 29/32* (2006.01)
*B65G 47/91* (2006.01)
(Continued)

(52) U.S. Cl.
CPC ............ *B65H 29/32* (2013.01); *B65G 47/91* (2013.01); *B65H 5/224* (2013.01); *B65H 29/242* (2013.01);
(Continued)

(58) Field of Classification Search
CPC .............................. B65H 29/39; B65H 29/242; B65H 2406/323; B65H 2406/351;
(Continued)

(56) References Cited

U.S. PATENT DOCUMENTS 3,659,840 A * 5/1972 Ruck ...................... B65H 29/58
271/279
3,708,058 A 1/1973 Kalven
(Continued)

FOREIGN PATENT DOCUMENTS

DE 29718611 U1 3/1998
DE 102015219329 A1 5/2016
(Continued)

OTHER PUBLICATIONS

Extended European Search Report in corresponding European Application No. 18382338.4, dated Nov. 23, 2018, 7 pages.

*Primary Examiner* — Jeremy R Severson
(74) *Attorney, Agent, or Firm* — Edell, Shapiro & Finnan, LLC

(57) ABSTRACT

According to some embodiments a conveying device for conveying goods includes at least one conveyor belt with an outer contact face against which the goods to be conveyed are held during conveyance. A main negative pressure holding area is provided adjacent to the conveyor belt, the main negative pressure holding area being configured to hold or release the goods to or from the conveyor belt by negative pressure. The conveyor belt includes at least one suction chamber on the outer contact face forming an additional negative pressure holding area, the suction chamber being in fluid communication with negative pressure holding means through at least one opening transversely going through the conveyor belt.

19 Claims, 4 Drawing Sheets

(51) Int. Cl.
   *B65H 29/24* (2006.01)
   *B65H 5/22* (2006.01)
   *B65G 21/20* (2006.01)
   *B21D 43/18* (2006.01)
   *B21D 43/22* (2006.01)

(52) U.S. Cl.
   CPC .............. *B21D 43/18* (2013.01); *B21D 43/22* (2013.01); *B65G 21/2036* (2013.01); *B65H 2406/3124* (2013.01); *B65H 2406/323* (2013.01); *B65H 2406/3223* (2013.01); *B65H 2406/351* (2013.01); *B65H 2701/173* (2013.01); *B65H 2701/175* (2013.01)

(58) Field of Classification Search
   CPC .. B65H 2406/3124; B65H 2301/44734; B65G 47/91; B65G 21/2036; B65G 57/04
   See application file for complete search history.

(56) References Cited

U.S. PATENT DOCUMENTS

| | | | | |
|---|---|---|---|---|
| 6,102,191 | A | * | 8/2000 | Janzen ............... B65G 21/2018 198/689.1 |
| 6,481,565 | B1 | * | 11/2002 | Sherwood .......... B65G 21/2036 198/689.1 |
| 6,823,986 | B2 | | 11/2004 | Vogel |
| 8,636,139 | B2 | * | 1/2014 | Umezawa ............ B65H 11/005 198/689.1 |
| 10,000,342 | B2 | * | 6/2018 | Alonso Ramila ...... B65G 47/91 |

FOREIGN PATENT DOCUMENTS

| | | |
|---|---|---|
| EP | 0904242 B1 | 2/2000 |
| EP | 1081067 B1 | 3/2001 |
| EP | 0827920 B1 | 10/2003 |
| EP | 1777176 A1 | 4/2007 |
| EP | 2241523 A1 | 10/2010 |
| JP | H0351209 A | 3/1991 |

* cited by examiner

CONVEYING DEVICE FOR CONVEYING GOODS

CROSS-REFERENCE TO RELATED APPLICATIONS

This application relates to and claims the benefit and priority to European Application No. EP18382338.4, filed May 17, 2018.

TECHNICAL FIELD

The present invention relates to conveying devices for conveying goods, particularly for conveying goods in the form of a sheet.

BACKGROUND

Conveying device for conveying goods, particularly for conveying goods in the form of a sheet, are known. Devices comprising one or more rotating conveyor belts which rotate around driven wheels are known, where the goods in the form of a sheet are conveyed hanging from the lower branch of the belts. The goods are held against or released from the conveyor belt by magnetic holding means for conveying ferromagnetic parts, and/or by negative pressure holding means for conveying ferromagnetic and/or non-ferromagnetic goods.

EP1777176A1 describes a conveying device for conveying goods, particularly for conveying goods in the form of a sheet, comprising a conveyor belt on each side of a main negative pressure holding area communicated with negative pressure holding means. Each conveyor belt comprises an outer contact face against which the goods are placed. The conveyor belts comprise a plurality of transverse suction chambers on the contact face forming additional negative pressure holding areas. These additional areas are communicated with the main negative pressure holding area, said additional areas being communicated with the negative pressure holding means through the main area.

SUMMARY

A conveying device for conveying goods, particularly for conveying goods in the form of a sheet, is provided that comprises at least one conveyor belt with an outer contact face against which the goods to be conveyed are placed during conveyance, and a main negative pressure holding area adjacent to the conveyor belt, the main negative pressure holding area being configured for holding or releasing the goods against or from said conveyor belt by negative pressure.

The conveyor belt comprises at least one suction chamber on the contact face forming an additional negative pressure holding area. The suction chamber is in fluid communication with negative pressure holding means through at least one opening transversely going through the conveyor belt.

The conveying device allows increasing the negative pressure holding area in an efficient manner, because at least one additional negative pressure holding area on which negative pressure holding means directly act through the opening of the conveyor belt is generated.

Therefore, a conveyor device that allows safely conveying goods by generating a negative pressure holding area that can be substantially greater than in conveying devices of the prior art, with an easy-to-build conveyor belt design, is obtained.

These and other advantages and features will become evident in view of the drawings and the detailed description.

DETAILED DESCRIPTION

Figure 1:
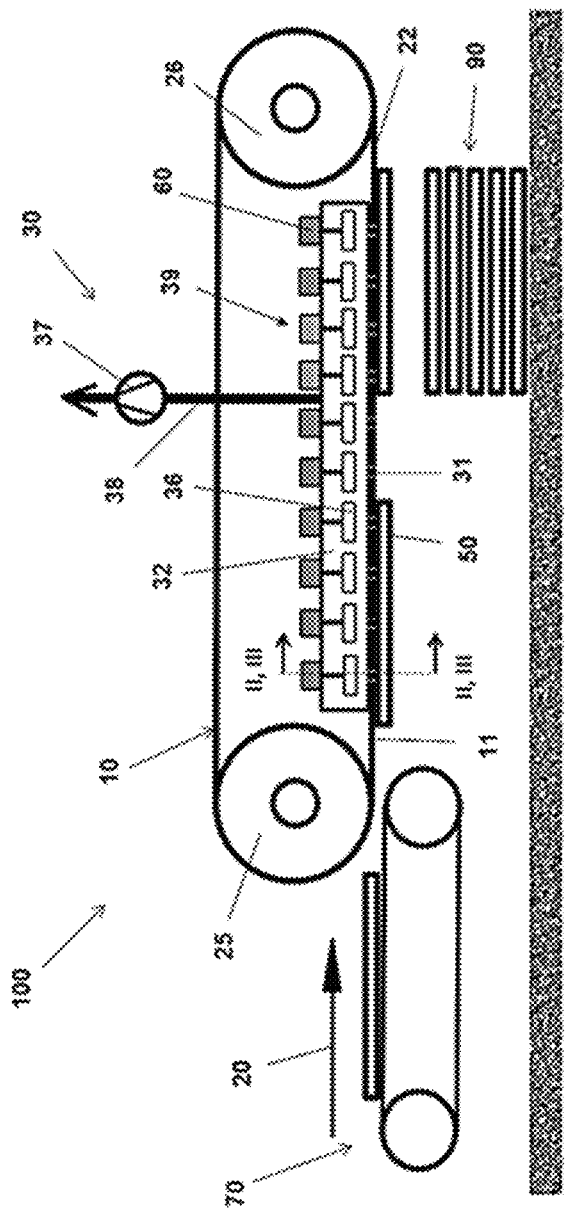
FIG. 1 shows a schematic view of a conveying device according to one embodiment.

FIG. 1 shows a schematic view of a conveying device for conveying goods 100 according to one embodiment. The conveying device for conveying goods 100, particularly for conveying goods 50 in the form of a plate, conveys ferromagnetic or non-ferromagnetic goods 50, such as aluminum or plastic sheets, for example, from a previous manufacturing process or from a stacking area depicted by means of an output conveyor 70, to a stacking area 90 for stacking the goods 50, the conveyance direction being depicted by means of the arrow 20.

In this embodiment, the conveyor device 100 comprises two conveyor belts 10 for conveying the goods 50 between both belts 10. In this embodiment, each conveyor belt 10 comprises an upper side and a lower side which rotate around two mechanically and/or electrically driven wheels 25, 26. The lower side of the conveyor belt 10 faces the output conveyor 70 at one end and the stacking area 90 for stacking the goods 50 at the other end. The goods 50 are held, hanging from the lower side, and are released when said goods 50 reach the stacking area 90.

The conveyor device 100 comprises a main negative pressure holding area A for holding or releasing the goods 50 and at least one conveyor belt 10 adjacent to the main negative pressure holding area A. In the embodiment shown in the drawings, as indicated the conveyor device 100 comprises two conveyor belts 10, the conveyor belts 10 being arranged on both sides of the main negative pressure holding area A. The conveyor belts 10 comprise an outer contact face 11 against which the goods 50 to be conveyed are placed during conveyance.

The conveyor belt 10 of the device 100 comprises at least one suction chamber 13 on the contact face 11 forming an additional negative pressure holding area B, the suction chamber 13 of the conveyor belt 10 being in fluid communication with negative pressure holding means 30 through at least one opening 18 transversely going through the conveyor belt 10. The negative pressure holding area is thereby increased in an efficient manner because at least one additional negative pressure holding area B on which negative pressure holding means 30 directly act through the opening of the conveyor belt 10 is generated.

According to one embodiment, the suction chamber 13 of the conveyor belt 10 is laterally closed, the suction chamber 13 therefore being separated from the main negative pressure holding area A. This allows assuring proper contact with the goods 50 along the entire width of the conveyor belt 10, and also allows using in a more efficient manner the air suctioned by the negative pressure holding means 30.

Figure 4:
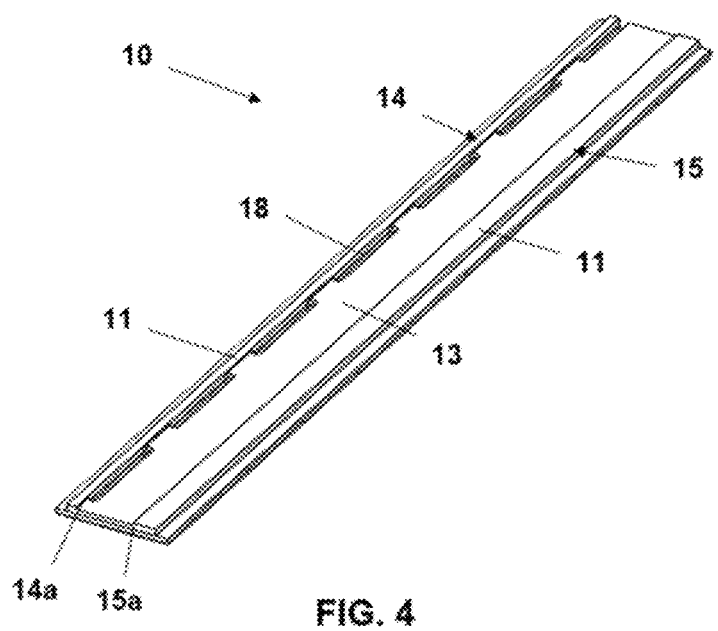
FIG. 4 shows a first perspective view of an embodiment of the conveyor belt of the device of FIG. 1, showing the suction chamber.

According to one embodiment, as shown in FIG. 4, the suction chamber 13 of the conveyor belt 10 is a longitudinal channel that is open at its ends. The manufacturing process and the process of cleaning of the conveyor belt 10 are thereby made much easier. For example, external cleaning means can be arranged in friction contact on at least at one of the ends 22 of the conveyor device 100, where rotation on the wheels 25 and 26 takes place when said conveyor belts 10 are in motion, and the conveyor belt 10 can be cleaned with the conveyor belt 10 in motion. Said cleaning means can comprise, for example, felts pushed towards the suction chamber 13 by means of springs or other pushing means and can be automated, where disassembly or the action of an operator is not required. The time required for cleaning the conveyor belts 10 is thereby reduced, and the risks inherent to said cleaning in the case of said conveyor belts 10 being in motion are also reduced.

According to one embodiment, as occurs in the embodiment shown in the drawings, the suction chamber 13 of the conveyor belt 10 is demarcated by two planar and straight longitudinal side surfaces 14a and 15a, which makes the process of cleaning the conveyor belt 10 even easier.

In the embodiment shown in the drawings, the conveyor belts 10 comprise on the contact face 11 a first longitudinal wall 14 comprising one of the two side surfaces 14a, and a second longitudinal wall 15 comprising the other side surface 15a. The first wall 14 comprises a first planar contact surface 14b, and the second wall 15 comprises a second planar contact surface 15b, the goods 50 being supported on said contact surfaces 14b and 15b. In the conveyor device 100, an optimal compromise can be reached between the additional negative pressure holding area B and the contact surfaces 14b and 15b, obtaining proper suction of the goods 50, in turn assuring proper contact of the conveyor belt 10 with the goods 50.

As shown in FIG. 4, in this embodiment the suction chamber 13 is fluidically communicated with a plurality of longitudinally aligned openings 18, said openings 18 being narrow and elongated longitudinal slots.

Figure 6:
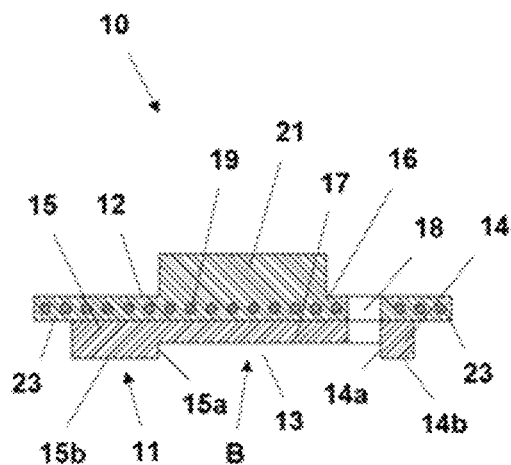
FIG. 6 shows a cross-section view of the conveyor belt of FIG. 4.
Figure 7:
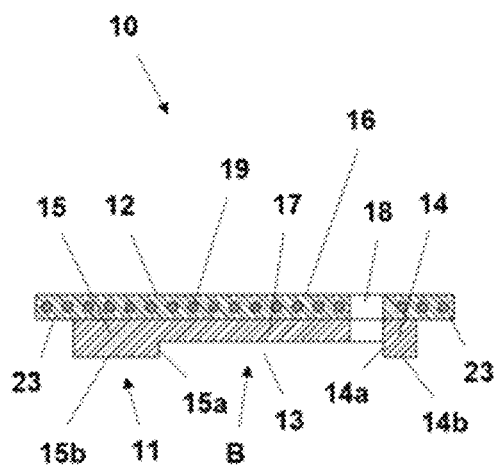
FIG. 7 shows a cross-section view of a second embodiment of the conveyor belt without gear teeth.

In the embodiment shown in the drawings, as observed in FIGS. 6 and 7, the conveyor belt comprises a contact plate 17 comprising the walls 14 and 15 and the suction chamber 13, the side walls 14 and 15 being arranged in an opposing manner, protruding from the base of the lower portion of the contact plate 17, and a base plate 16 attached to the contact plate 17 by different possible attachment means such as welding, glue, etc. Said side walls 14 and 15 define on their lower face, with the contact surfaces 14b and 15b, a plane which is the outer contact face 11 of the conveyor belt 10, the first side wall 14 in this embodiment being narrower than the second side wall 15.

Figure 5:
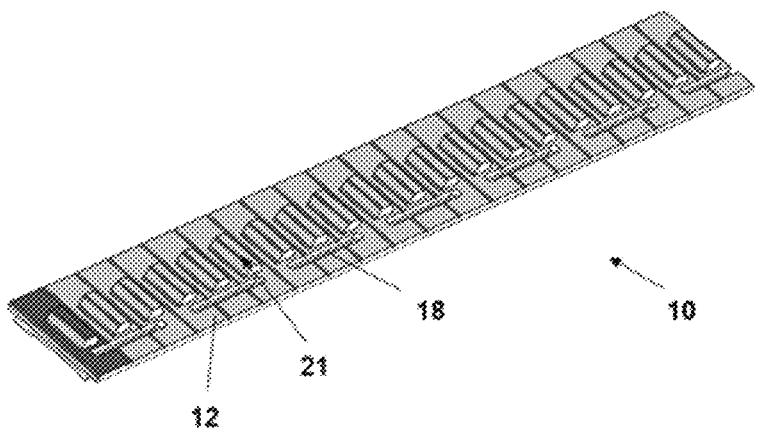
FIG. 5 shows a second perspective view of the conveyor belt of FIG. 4, showing the gear teeth.

The base plate 16 comprises a plurality of transversely arranged teeth 21, shown in FIG. 5, which are configured for driving and guiding the conveyor belt 10. The conveyor belts 10 comprise on a rear face 12, opposite the contact face 11, a plurality of teeth 21 arranged along the entire length thereof. To drive the conveyor belts 10 by means of the teeth 21, the wheels 25 and 26 of the device 100 comprise gears with which said teeth 21 mesh. In other embodiments of the device 100, the conveyor belts 10 do not comprise teeth 21, and the rear face 12 is smooth. To drive the conveyor belts 10 in said embodiments, said conveyor belts 10 are tightly tensed around the wheels 25 and 26 of the device 100.

As shown in FIGS. 6 and 7, the conveyor belts 10 comprise a plurality of longitudinally arranged embedded filaments 19. In this embodiment of the conveying device for conveying goods 100, the base plate 16 comprises the plurality of filaments 19. Said filaments 19 can be metallic or made from a non-ferric or non-magnetic material, such as Kevlar, for example, the filaments 19 preferably being arranged in the longitudinal direction 20 of the conveyor belt 10 and aligned in the transverse direction. The conveyor belts are thereby provided with considerable strength and resistance to bending stresses and forces. One way to generate the shape of the conveyor belts 10 is by means of machining the surfaces thereof, where this machining, with the features defined for the conveyor belts 10, is more cost-effective avoiding or reducing machining operations, and thereby considerably reducing their cost with respect to other conveyor belts of the prior art. To make it easier to generate the openings 18 by means of machining, filaments 19 are not arranged precisely in the space of said conveyor belts 10 where the openings 18 are arranged.

While it is possible for there to be different negative pressure holding means, in one embodiment the same negative pressure holding means 30 is used for both the main negative pressure holding area A and the additional negative pressure holding areas B. As shown in FIG. 1, the negative pressure holding means 30 preferably comprises a negative pressure chamber 32 that runs along the conveyor device 100, at least one negative pressure source 37 connected with the negative pressure chamber 32, and in this embodiment, a plurality of negative pressure holding assemblies 39. The negative pressure source 37, for example, is formed by two suction or vacuum pump assemblies which generate a negative pressure in the negative pressure chamber 32 through negative pressure ducts 38, said negative pressure ducts 38 being fluidically communicated with the negative pressure chamber 32 through side windows (not depicted) arranged in said negative pressure chamber 32.

Figure 2:
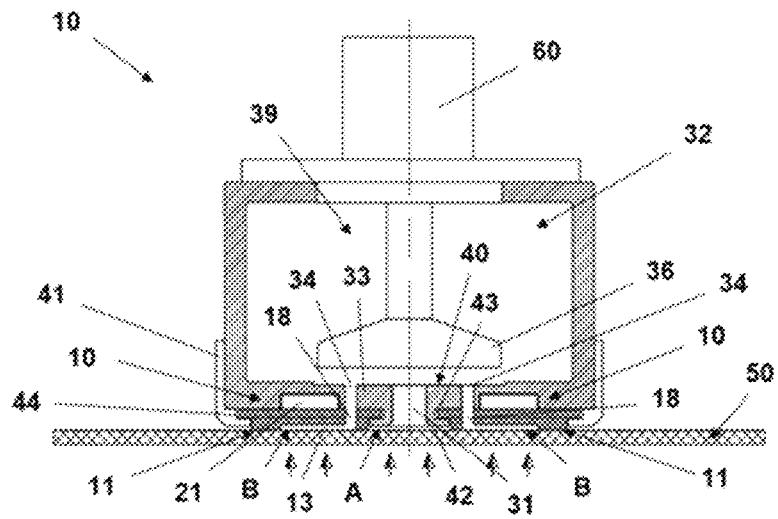
FIG. 2 shows a cross-section view of the device of FIG. 1, the movable element of the negative pressure holding means being in an open position, and a good being held against the conveyor belts by the negative pressure holding means.
Figure 3:
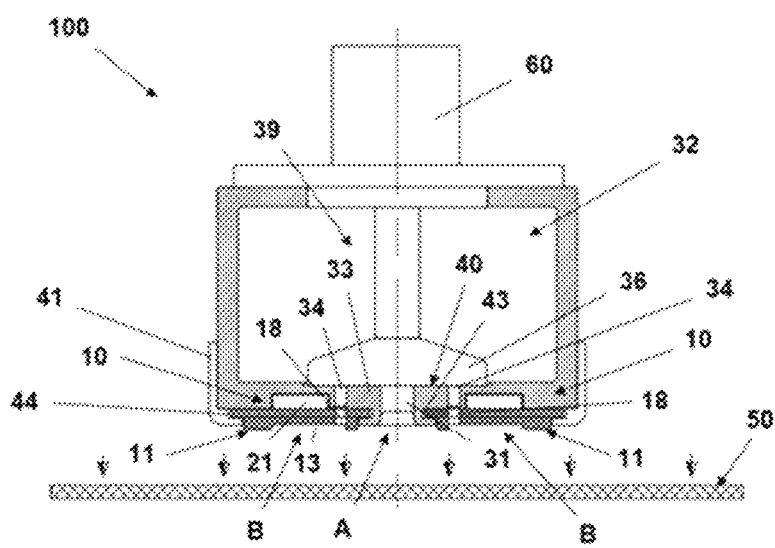
FIG. 3 shows a cross-section view of the device of FIG. 1, the movable element being in a closed position blocking the set of outlet ports of the negative pressure chamber, and the good being released from the conveyor belts.

As shown in FIGS. 2 and 3, each negative pressure holding assembly 39 comprises at least a first negative pressure conduit 31 fluidically communicating the main negative pressure holding area A with the negative pressure chamber 32, at least a second negative pressure conduit 34 fluidically communicating each conveyor belt 10 with the negative pressure chamber 32, and a movable blocking device 36 housed in the negative pressure chamber 32. As shown in FIGS. 2 and 3, the conveyor belts 10 are laterally closed with respect to the first negative pressure conduit 31.

The movable blocking device 36 is configured for being arranged in an open position, shown in FIG. 2, in which it allows the passage of air through the first negative pressure conduit 31 and through the second negative pressure conduits 34, and in a closed position, shown in FIG. 3, in which it blocks the passage of air through said negative pressure conduits 31 and 34. The movable blocking device 36 moves linearly in a direction perpendicular to the conveyor belts 10, said movable blocking device 36 being supported in the closed position on a planar seating surface 40 parallel to the conveyor belts 10, into which the negative pressure conduits 31 and 34 lead. The device 100 comprises as many movable blocking devices 36 as first negative pressure conduits 31, each movable blocking device 36 being associated with a first negative pressure conduit 31.

The negative pressure chamber 32 is an elongated chamber that projects in the longitudinal direction of the device 100, where said device 100 may comprise more than one negative pressure chamber 32. The conveyor belts 10 are arranged adjacent to the lower portion of the negative pressure chamber 32 at the outer portion thereof, for which purpose the device 100 comprises in its structure elements which allow said attachment, which elements allow the movement of said conveyor belts 10 when they are in motion. The negative pressure chamber 32 comprises a structure formed by a profile comprising a wall 33. Said wall 33 comprises negative pressure conduits 31 and 34 in the lower portion thereof which allow fluidically communicating the inside of the negative pressure chamber 32 with the outside of said chamber 32. In said portion of the wall 33 there are formed two second negative pressure conduits 34, and between them there is formed a first negative pressure conduit 31. The first negative pressure conduit 31 extends downwards more than the two second negative pressure conduits 34 do. Therefore in this embodiment of the device 100, the first negative pressure conduit 31 is arranged in the negative pressure chamber 32.

These movable blocking devices 36 are operated by means of actuators 60, these actuators 60 preferably being pneumatic or hydraulic cylinder and piston units, but they could also be rack and pinion units, cams, or actuators of another type. The device 100 comprises position detectors for detecting the position of the goods 50 to be conveyed, such that the actuators 60 of the movable blocking devices 36 are activated when they detect the presence of goods 50, said movable blocking devices 36 moving away from the negative pressure conduits 31 and 34, and applying a suction to said goods 50.

The first negative pressure conduit 31 comprises in its lower portion two side protrusions which form first slots 43 with the wall 33. On the outer sides in the lower portion of the negative pressure chamber 32 there are arranged profiles 41 projecting as flaps into the negative pressure chamber 32, said flaps forming with the lower portion of the wall 33 second slots 44. The base plate 16 of the conveyor belts 10 laterally protrudes from the contact plate 17 as support elements 23, such that said support elements 23 are inserted in the slots 43, 44, the contact plate 17 being inserted between the side protrusions of the first negative pressure conduit 31 and the flaps of the profiles 41 of the device 100.

Since the first negative pressure conduits 31 are arranged in the negative pressure chamber 32 in the lower portion thereof, adjacent to the conveyor belts 10, each first negative pressure conduit 31 allows the fluid connection between the inside of the negative pressure chamber 32 and the gap generated between said conveyor belts 10, which is the main negative pressure holding area A. The first negative pressure conduits 31 end a short distance from the plane formed by the outer contact faces 11 of the conveyor belts 10, forming a holding channel 42 in the main negative pressure holding area A, between said end of the negative pressure conduits 31 and the goods 50 to be conveyed, when suction is applied to them by the negative pressure holding means 30.

The openings 18 are arranged closer to the inner side of the conveyor belts 10 than the center thereof. Said openings 18 are thereby located close to the first negative pressure conduits 31 when the conveyor belts 10 are mounted in the device 100. In that sense, the second negative pressure conduits 34 of the wall 33 of the negative pressure chamber 32 are arranged close to the first negative pressure conduit 31, at the same distance as the distance from the openings 18 of the first negative pressure conduit 31, the position of the second negative pressure conduits 34 and of the openings 18 coinciding in the transverse direction of the device 100.

In the shown embodiment of the device 100, the negative pressure conduits 31 and 34 have a substantially cylindrical shape on the inner face of the wall 33, and a bell shape that longitudinally expands in the longitudinal direction of the conveyor belts 10 on the outer face of the wall 33 of the negative pressure chamber 32. Therefore, this embodiment of the device 100 comprises the same number of openings 18 in the conveyor belts 10 as the number of second negative pressure conduits 34 and half the number of the first negative pressure conduits 31 in the negative pressure chamber 32. The openings 18 have a length such that when the conveyor belts 10 move, said openings 18 and the second negative pressure conduits 34 overlap one another, such that there is always fluid communication between the negative pressure chamber 32 and the suction chamber 13 on the outside or on the contact face 11 of said conveyor belts 10. Therefore, the conveyor belts 10 allow the passage of air between the negative pressure chamber 32 and the goods 50 arranged adjacent to the conveyor belts 10 on the outer contact face 11 thereof.

Since the conveyor belts 10 are adjacent to the lower face of the wall 33 of the negative pressure chamber 32, substantial friction takes place with the shifting movement of said conveyor belts 10. To make said movement easier and to reduce the wear caused, the rear friction face 12 of the conveyor belt 10 is coated with a low-friction coating, which may be of different materials and hardnesses.

Although the conveyor belts 10 are open at their ends at the ends 22 of the conveying device for conveying goods 100, their very small opening, depending on the suction capacity that is generated with the negative pressure holding means 30, makes the loss of suction negligible, assuring proper support of the goods 50 to be conveyed. In the embodiment shown in the drawings, as observed in FIGS. 2 and 3, the conveyor device 100 is symmetrical with respect to a longitudinal plane perpendicular to the conveyor belts 10.

The following clauses recite, in some instances, additional embodiments.

Clause 1. A conveying device for conveying goods, particularly for conveying goods (50) in the form of a sheet, comprising at least one conveyor belt (10) with an outer contact face (11) against which the goods (50) to be conveyed are placed during conveyance, and a main negative pressure holding area (A) adjacent to the conveyor belt (10), the main negative pressure holding area (A) being configured for holding or releasing the goods (50) against or from said conveyor belt (10) by negative pressure, the conveyor belt (10) comprising at least one suction chamber (13) on the contact face (11) forming an additional negative pressure holding area (B), the suction chamber (13) of the conveyor belt (10) being in fluid communication with negative pressure holding means (30) through at least one opening (18) transversely going through the conveyor belt (10).

Clause 2. The conveying device for conveying goods according to clause 1, wherein the suction chamber (13) of the conveyor belt (10) is laterally closed, the suction chamber (13) therefore being separated from the main negative pressure holding area (A).

Clause 3. The conveying device for conveying goods according to clause 1 or 2, wherein the suction chamber (13) of the conveyor belt (10) is a longitudinal channel that is open at its ends.

Clause 4. The conveying device for conveying goods according to clause 3, wherein the suction chamber (13) of the conveyor belt (10) is demarcated by two planar and straight longitudinal side surfaces (14*a*, 15*a*).

Clause 5. The conveying device for conveying goods according to clause 4, wherein the conveyor belt (10) comprises on the contact face (11) a first longitudinal wall (14) comprising one of the two side surfaces (14*a*), and a second longitudinal wall (15) comprising the other side surface (15*a*), the first wall (14) comprising a first planar contact surface (14*b*), and the second wall (15) comprising a second planar contact surface (15*b*), the goods (50) being supported on said contact surfaces (14*b*, 15*b*).

Clause 6. The conveying device for conveying goods according to clause 5, wherein the conveyor belt (10) comprises a contact plate (17) comprising the walls (14, 15) and the suction chamber (13), and a base plate (16) attached to the contact plate (17), the base plate (16) comprising a plurality of transversely arranged teeth (21) configured for driving and guiding the conveyor belt (10).

Clause 7. The conveying device for conveying goods according to clause 6, wherein the base plate (16) comprises a plurality of longitudinally arranged embedded filaments (19).

Clause 8. The conveying device for conveying goods according to any of the preceding clauses, wherein the suction chamber (13) is fluidically communicated with a plurality of longitudinally aligned openings (18).

9. The conveying device for conveying goods according to any of the preceding clauses, wherein the opening (18) is a narrow and elongated longitudinal slot.

Clause 10. The conveying device for conveying goods according to any of the preceding clauses, wherein the negative pressure holding means (30) which are in fluid communication with the suction chamber (13) of the conveyor belt (10) are also in fluid communication with the main negative pressure holding area (A).

Clause 11. The conveying device for conveying goods according to the preceding clause, wherein the negative pressure holding means (30) comprises:
 a negative pressure chamber (32) that runs along the conveyor device (100),
  at least one negative pressure source (37) connected with the negative pressure chamber (32), and
  at least one negative pressure holding assembly (39) comprising:
   at least a first negative pressure conduit (31) fluidically communicating the main negative pressure holding area (A) with the negative pressure chamber (32),
   at least a second negative pressure conduit (34) fluidically communicating the conveyor belt (10) with the negative pressure chamber (32), and
   a movable blocking device (36) housed in the negative pressure chamber (32) configured for being arranged in an open position in which it allows passage through the first negative pressure conduit (31) and through the second negative pressure conduit (34), and in a closed position in which it blocks the passage through said negative pressure conduits (31, 34).

Clause 12. The conveying device for conveying goods according to clause 11, wherein the movable blocking device (36) moves linearly in a direction perpendicular to the conveyor belts (10), said movable blocking device (36) being supported in the closed position on a planar seating surface (40) parallel to the conveyor belts (10) into which the negative pressure conduits (31, 34) lead.

Clause 13. The conveying device for conveying goods according to clause 11 or 12, wherein the negative pressure holding means (30) comprise throughout the negative pressure chamber (32) a plurality of negative pressure holding assemblies (39).

Clause 14. The conveying device for conveying goods according to any of the preceding clauses, comprising a conveyor belt (10) on each side of the main negative pressure holding area (A), both conveyor belts (10) having the same configuration.

Clause 15. The conveying device for conveying goods according to clause 14, which is symmetrical with respect to a longitudinal plane perpendicular to the conveyor belts (10).

What is claimed is:

1. A conveying device for conveying a good, the conveying device comprising:
 a negative pressure chamber including a wall that includes a first negative pressure conduit and a second negative pressure conduit, the first negative pressure conduit being larger than the second negative pressure conduit;
 a first conveyor belt having a suction chamber in fluid communication with the second negative pressure conduit via a through opening in the first conveyor belt, the first conveyor belt including an outer contact face to which the good is held against when a negative pressure is produced in the second negative pressure conduit, the suction chamber being a longitudinal channel with no closed ends; and
 a holding area to which the good is held against when a negative pressure is produced in the first negative pressure conduit.

2. The conveying device according to claim 1, wherein the first negative pressure conduit is longer than the second negative pressure conduit.

3. The conveying device according to claim 1, wherein the first conveyor belt includes first and second longitudinal walls that respectfully have facing first and second side surfaces that at least partially define the suction chamber, the first longitudinal wall having a first lower contact surface and the second longitudinal wall having a second lower contact surface, the first and second lower contact surfaces collectively forming the outer contact face of the first conveyor belt.

4. The conveying device according to claim 3, wherein the first and second side surfaces of the respective first and second longitudinal walls are planar.

5. The conveying device according to claim 4, wherein the first and second lower contact surfaces are respectively arranged orthogonal to the first and second side surfaces.

6. The conveying device according to claim 3, further comprising a drive wheel having a plurality of transversely arranged teeth, the first conveyor belt including a contact plate that includes the first and second longitudinal walls and the suction chamber, the first conveyor belt further including a base plate attached to the contact plate, the base plate including a plurality of transversely arranged teeth configured to engage with the plurality of transversely arranged teeth of the drive wheel.

7. The conveying device according to claim 6, wherein the base plate comprises a plurality of longitudinally arranged embedded filaments.

8. The conveying device according claim 1, wherein the suction chamber is in fluid communication with a plurality of through openings in the first conveyor belt.

9. The conveying device according to claim 8, wherein each of the plurality of through openings is an elongated longitudinal slot.

10. The conveying device according to claim 1, wherein the through opening is an elongated longitudinal slot.

11. The conveying device according to claim 1, further comprising a negative pressure source coupled to the negative pressure chamber and configured to produce in the negative pressure chamber a negative pressure.

12. The conveying device according to claim 11, further comprising a movable blocking device housed in the negative pressure chamber and configured for being arranged in an open position in which it allows the negative pressure inside the negative pressure chamber to be applied through both the first and second negative pressure conduits, and in a closed position in which it does not allow the negative pressure inside the negative pressure chamber to be applied through the first and second negative pressure conduits.

13. The conveying device according to claim 12, wherein the movable blocking device is configured to move linearly in a direction perpendicular to the outer contact face of the first conveyor belt, when in the closed position the movable blocking device is supported on a seating surface located on the wall of the negative pressure chamber.

14. The conveying device according to claim 13, wherein the seating surface is arranged parallel to the outer contact face of the first conveyor belt.

15. The conveying device according to claim 1, further comprising a second conveyor belt, the first conveyor belt being located on a first side of the holding area and the second conveyor belt being located on a second side of the holding area opposite the first side.

16. The conveying device according to claim 15, wherein the wall of the negative pressure chamber includes a third negative pressure conduit, the first negative pressure conduit being larger than the third negative pressure conduit, the second conveyor belt having a suction chamber in fluid communication with the third negative pressure conduit via a through opening in the second conveyor belt, the second conveyor belt including an outer contact face to which the good is held against when a negative pressure is produced in the third negative pressure conduit.

17. The conveying device according to claim 16, wherein the first conveyor belt includes first and second longitudinal walls that respectfully have facing first and second side surfaces that at least partially define the suction chamber of the first conveyor belt, the first longitudinal wall of the first conveyor belt having a first lower contact surface and the second longitudinal wall of the first conveyor belt having a second lower contact surface, the first and second lower contact surfaces of the first conveyor belt collectively forming the outer contact face of the first conveyor belt, and wherein the second conveyor belt includes first and second longitudinal walls that respectfully have facing first and second side surfaces that at least partially define the suction chamber of the second conveyor belt, the first longitudinal wall of the second conveyor belt having a first lower contact surface and the second longitudinal wall of the second conveyor belt having a second lower contact surface, the first and second lower contact surfaces of the second conveyor belt collectively forming the outer contact face of the second conveyor belt.

18. The conveying device according to claim 17, wherein the first and second conveyor belts are arranged symmetrical with respect to the holding area.

19. The conveying device according to claim 16, further comprising a negative pressure source coupled to the negative pressure chamber and configured to produce in the negative pressure chamber a negative pressure, the conveying device further comprising a movable blocking device housed in the negative pressure chamber and configured for being arranged in an open position in which it allows the negative pressure inside the negative pressure chamber to be applied through each of the first, second and third negative pressure conduits, and in a closed position in which it does not allow the negative pressure inside the negative pressure chamber to be applied through the first, second and third negative pressure conduits.

\* \* \* \* \*